United States Patent
Urban et al.

(10) Patent No.: US 9,124,368 B2
(45) Date of Patent: Sep. 1, 2015

(54) TRANSCEIVER FOR USE IN FIBRE NETWORK

(71) Applicant: Telefonaktiebolaget L M Ericsson (publ), Stockholm (SE)

(72) Inventors: Patryk Urban, Vallingby (SE); Boris Dortschy, Hagersten (SE); Gemma Vall-Llosera, Jarfalla (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 113 days.

(21) Appl. No.: 14/004,414

(22) PCT Filed: Jun. 4, 2013

(86) PCT No.: PCT/SE2013/050644
§ 371 (c)(1),
(2) Date: Sep. 10, 2013

(87) PCT Pub. No.: WO2014/196907
PCT Pub. Date: Dec. 11, 2014

(65) Prior Publication Data
US 2015/0131999 A1   May 14, 2015

(51) Int. Cl.
*H04J 14/02* (2006.01)
*H04B 10/40* (2013.01)

(52) U.S. Cl.
CPC .............. *H04B 10/40* (2013.01); *H04J 14/02* (2013.01); *H04J 14/0265* (2013.01); *H04J 14/0298* (2013.01); *H04J 14/0282* (2013.01); *H04J 14/0283* (2013.01)

(58) Field of Classification Search
CPC ...................................................... H04J 14/02
See application file for complete search history.

(56) References Cited

U.S. PATENT DOCUMENTS

| 6,538,781 | B1 | 3/2003 | Beierle et al. | |
| 2007/0147838 | A1* | 6/2007 | Kim et al. | 398/72 |
| 2011/0135305 | A1* | 6/2011 | Barnard | 398/49 |

OTHER PUBLICATIONS

2010 JDS Uniphase Corporation, WDMFILTERREDBLUECBAND.DS.CS.AE, Mar. 2010, pp. 1-2.*

(Continued)

*Primary Examiner* — David Payne
*Assistant Examiner* — Omar S Ismail
(74) *Attorney, Agent, or Firm* — Nicholson De Vos Webster & Elliott LLP

(57) ABSTRACT

A method performed by a transceiver for use in fiber network for sending and/or receiving signals. Transceiver includes SCM device; laser diode; Red-Blue Filter, RBF, having red, blue and common channels; PD; and Subcarrier Demultiplexing, SCDM, device. SCM device receives electromagnetic signals on at least two input ports, multiplexes electromagnetic signals and outputs signal to laser diode. Laser diode receives signal, converts signal to optical signals comprising plurality of subcarriers of different frequencies distributed in frequency around main optical carrier, and outputs subcarriers to red channel of RBF. RBF receives subcarriers and outputs to the fiber network via common channel. RBF receives subcarriers on common channel and filters out blue frequencies and outputs to photo diode. Photodiode receives the subcarriers having blue wavelengths, converts subcarriers into electromagnetic signal and outputs electromagnetic signal to SCDM device. SCDM device demultiplexes electromagnetic signal into at least two electromagnetic signals and outputs.

14 Claims, 8 Drawing Sheets

(56) References Cited

OTHER PUBLICATIONS

International Search Report and Written Opinion, Application No. PCT/SE2013/050644, dated Feb. 28, 2014, 10 pages.

Yang Qiu, et al., "A Simple Multicast Overlay Scheme for WDM Passive Optical Networks with Symmetric Two-Way Traffic," Jul. 13, 2009, pp. 1-2, Optoelectronics and Communications Conference, IEEE, Piscataway, NJ, USA.

* cited by examiner

TRANSCEIVER FOR USE IN FIBRE NETWORK

CROSS-REFERENCE TO RELATED APPLICATIONS

This application is a National stage of International Application No. PCT/SE2013/050644, filed Jun. 4, 2013, which is hereby incorporated by reference in its entirety.

TECHNICAL FIELD

The present disclosure relates to a transceiver and in particular to a transceiver to be used in a fibre network.

BACKGROUND

Fibre networks in combination with other networks, e.g. wireless communication networks are becoming more and more common. One particular example of such a combination is to connect a standard base station to a distributed antenna system by means of passive or active components. In an example, optical fibre connects the base station to a remote unit which in turn connects to the antennas.

Such solutions have no frequency reuse within a big antenna cluster, no end-to-end optimization and coordination and they are isolated subsystems which do not consider any coordination function between antennas.

SUMMARY

The object is to obviate at least some of the problems outlined above. In particular, it is an object to provide a transceiver and a method performed by the transceiver for transmitting and/or receiving signals on a fibre network. A further object is to provide an Optical Backend Termination, OBT, and a method performed by the OBT for sending and receiving signals to/from at least two Optical Frontend Nodes, OFNs, comprised in a fibre network. Still an object is to provide an OFN and a method performed by the OFN for sending and receiving signals to/from an OBT in a fibre network. Yet an object is to provide an optical distribution network comprising an OBT and at least two OFNs and a method performed by the optical distribution network for sending and receiving signals between the OBT and the OFNs. These objects and others may be obtained by providing a transceiver, an OBT, and OFN and an optical distribution network and a respective method performed by a transceiver, an OBT, and OFN and an optical distribution network according to the independent claims attached below.

According to an aspect a transceiver adapted for use in a fibre network for transmitting and/or receiving signal on the fibre network is provided. The transceiver comprises a Subcarrier Multiplexing, SCM, device; a laser diode; a Red-Blue Filter, RBF, having a red channel, a blue channel and a common channel; a Photo Diode, PD; and a Subcarrier Demultiplexing, SCDM device. The SCM device comprises at least two input ports and one output port. The SCM device is adapted to receive electromagnetic signals on the at least two input ports, to multiplex the electromagnetic signals to a multiplexed electromagnetic signal and to output the multiplexed electromagnetic signal to the laser diode. The laser diode is adapted to receive the multiplexed electromagnetic signal, to convert the multiplexed electromagnetic signal to optical signals comprising a plurality of subcarriers of different frequencies distributed in frequency around a main optical carrier and to output the plurality of wavelengths to the red channel of the RBF. The RBF is adapted to receive the plurality of subcarriers, and to output the subcarriers to the fibre network via the common channel. The RBF further is adapted to receive subcarriers on the common channel and to filter out blue frequencies of the received subcarriers and to output the subcarriers having blue wavelengths to the photo diode. The photodiode is adapted to receive the subcarriers having blue wavelengths from the RBF, to convert the subcarriers into an electromagnetic signal and to output the electromagnetic signal to the SCDM device. The SCDM device is adapted to receive the electromagnetic signal, to demultiplex the electromagnetic signal into at least two electromagnetic signals and to output the at least two electromagnetic signals.

According to an aspect, an OBT operable to be comprised in a fibre network for sending and/or receiving signals to/from at least two OFNs comprised in the fibre network are provided. The OBT comprises a transceiver comprising a Subcarrier Multiplexing, SCM, device; a laser diode; a Red-Blue Filter, RBF, having a red channel, a blue channel and a common channel; a Photo Diode, PD; and a Subcarrier Demultiplexing, SCDM device. The SCM device comprises at least two input ports and one output port. The SCM device is adapted to receive electromagnetic signals on the at least two input ports, to multiplex the electromagnetic signals to a multiplexed electromagnetic signal and to output the multiplexed electromagnetic signal to the laser diode. The laser diode is adapted to receive the multiplexed electromagnetic signal, to convert the multiplexed electromagnetic signal to optical signals comprising a plurality of subcarriers of different frequencies distributed in frequency around a main optical carrier and to output the plurality of wavelengths to the red channel of the RBF. The RBF is adapted to receive the plurality of subcarriers, and to output the subcarriers to the fibre network via the common channel. The RBF further is adapted to receive subcarriers on the common channel and to filter out blue frequencies of the received subcarriers and to output the subcarriers having blue wavelengths to the photo diode. The photodiode is adapted to receive the subcarriers having blue wavelengths from the RBF, to convert the subcarriers into an electromagnetic signal and to output the electromagnetic signal to the SCDM device. The SCDM device is adapted to receive the electromagnetic signal, to demultiplex the electromagnetic signal into at least two electromagnetic signals and to output the at least two electromagnetic signals.

According to an aspect, an OFN operable to be comprised in a fibre network for sending and/or receiving signals to/from an OBT comprised in the fibre network are provided. The OFN comprises a transceiver comprising a Subcarrier Multiplexing, SCM, device; a laser diode; a Red-Blue Filter, RBF, having a red channel, a blue channel and a common channel; a Photo Diode, PD; and a Subcarrier Demultiplexing, SCDM device. The SCM device comprises at least two input ports and one output port. The SCM device is adapted to receive electromagnetic signals on the at least two input ports, to multiplex the electromagnetic signals to a multiplexed electromagnetic signal and to output the multiplexed electromagnetic signal to the laser diode. The laser diode is adapted to receive the multiplexed electromagnetic signal, to convert the multiplexed electromagnetic signal to optical signals comprising a plurality of subcarriers of different frequencies distributed in frequency around a main optical carrier and to output the plurality of wavelengths to the red channel of the RBF. The RBF is adapted to receive the plurality of subcarriers, and to output the subcarriers to the fibre network via the common channel. The RBF further is adapted to receive subcarriers on the common channel and to filter out blue frequencies of the received subcarriers and to output the subcarriers having blue wavelengths to the photo diode. The photodiode is adapted to receive the subcarriers having blue wavelengths from the RBF, to convert the subcarriers into an electromagnetic signal and to output the electromagnetic signal to the SCDM device. The SCDM device is adapted to receive the electromagnetic signal, to demultiplex the electromagnetic signal into at least two electromagnetic signals and to output the at least two electromagnetic signals.

According to an aspect, an optical distribution network comprising an OBT and at least two OFNs is provided. The OBT and the OFN each comprises a respective transceiver comprising a Subcarrier Multiplexing, SCM, device; a laser diode; a Red-Blue Filter, RBF, having a red channel, a blue channel and a common channel; a Photo Diode, PD; and a Subcarrier Demultiplexing, SCDM device. The SCM device comprises at least two input ports and one output port. The SCM device is adapted to receive electromagnetic signals on the at least two input ports, to multiplex the electromagnetic signals to a multiplexed electromagnetic signal and to output the multiplexed electromagnetic signal to the laser diode. The laser diode is adapted to receive the multiplexed electromagnetic signal, to convert the multiplexed electromagnetic signal to optical signals comprising a plurality of subcarriers of different frequencies distributed in frequency around a main optical carrier and to output the plurality of wavelengths to the red channel of the RBF. The RBF is adapted to receive the plurality of subcarriers, and to output the subcarriers to the fibre network via the common channel. The RBF further is adapted to receive subcarriers on the common channel and to filter out blue frequencies of the received subcarriers and to output the subcarriers having blue wavelengths to the photo diode. The photodiode is adapted to receive the subcarriers having blue wavelengths from the RBF, to convert the subcarriers into an electromagnetic signal and to output the electromagnetic signal to the SCDM device. The SCDM device is adapted to receive the electromagnetic signal, to demultiplex the electromagnetic signal into at least two electromagnetic signals and to output the at least two electromagnetic signals.

According to an aspect, a method performed by a transceiver for use in a fibre network for sending and/or receiving signals on the fibre network is provided. The transceiver comprises a Subcarrier Multiplexing, SCM, device; a laser diode; a Red-Blue Filter, RBF, having a red channel, a blue channel and a common channel; a Photo Diode, PD; and a Subcarrier Demultiplexing, SCDM device. The method comprises the SCM device receiving electromagnetic signals on at least two input ports, multiplexing the electromagnetic signals into a multiplexed electromagnetic signal and outputting the multiplexed electromagnetic signal to the laser diode. The method comprises the laser diode receiving the multiplexed electromagnetic signal, converting the multiplexed electromagnetic signal to optical signals comprising a plurality of subcarriers of different frequencies or wavelengths distributed in frequency around a main optical carrier, and outputting the plurality of subcarriers to the red channel of the RBF. The method further comprises the RBF receiving the plurality of subcarriers, and outputting the subcarriers to the fibre network via the common channel, the RBF further receiving subcarriers on the common channel and filtering out blue frequencies of the received subcarriers and outputting the subcarriers having blue frequencies to the photo diode. Still further, the method comprises the photodiode receiving the subcarriers having blue wavelengths from the RBF, converting the subcarriers into an electromagnetic signal and outputting the electromagnetic signal to the SCDM device; and the SCDM device receiving the electromagnetic signal, demultiplexing the electromagnetic signal into at least two electromagnetic signals and outputting the at least two electromagnetic signals.

According to an aspect, a method performed by an OBT operable to be comprised in a fibre network for sending and receiving signals to/from at least two OFNs comprised in the fibre network is provided. The OBT comprises a transceiver comprising a Subcarrier Multiplexing, SCM, device; a laser diode; a Red-Blue Filter, RBF, having a red channel, a blue channel and a common channel; a Photo Diode, PD; and a Subcarrier Demultiplexing, SCDM device. The method comprises the SCM device receiving electromagnetic signals on at least two input ports, multiplexing the electromagnetic signals into a multiplexed electromagnetic signal and outputting the multiplexed electromagnetic signal to the laser diode. The method comprises the laser diode receiving the multiplexed electromagnetic signal, converting the multiplexed electromagnetic signal to optical signals comprising a plurality of subcarriers of different frequencies or wavelengths distributed in frequency around a main optical carrier, and outputting the plurality of subcarriers to the red channel of the RBF. The method further comprises the RBF receiving the plurality of subcarriers, and outputting the subcarriers to the fibre network via the common channel, the RBF further receiving subcarriers on the common channel and filtering out blue frequencies of the received subcarriers and outputting the subcarriers having blue frequencies to the photo diode. Still further, the method comprises the photodiode receiving the subcarriers having blue wavelengths from the RBF, converting the subcarriers into an electromagnetic signal and outputting the electromagnetic signal to the SCDM device; and the SCDM device receiving the electromagnetic signal, demultiplexing the electromagnetic signal into at least two electromagnetic signals and outputting the at least two electromagnetic signals.

According to an aspect, a method performed by an OFN, operable to be comprised in a fibre network, for sending and receiving signals to/from an OBT is provided. The OFN comprises a transceiver comprising a Subcarrier Multiplexing, SCM, device; a laser diode; a Red-Blue Filter, RBF, having a red channel, a blue channel and a common channel; a Photo Diode, PD; and a Subcarrier Demultiplexing, SCDM device. The method comprises the SCM device receiving electromagnetic signals on at least two input ports, multiplexing the electromagnetic signals into a multiplexed electromagnetic signal and outputting the multiplexed electromagnetic signal to the laser diode. The method comprises the laser diode receiving the multiplexed electromagnetic signal, converting the multiplexed electromagnetic signal to optical signals comprising a plurality of subcarriers of different frequencies or wavelengths distributed in frequency around a main optical carrier, and outputting the plurality of subcarriers to the red channel of the RBF. The method further comprises the RBF receiving the plurality of subcarriers, and outputting the subcarriers to the fibre network via the common channel, the RBF further receiving subcarriers on the common channel and filtering out blue frequencies of the received subcarriers and outputting the subcarriers having blue frequencies to the photo diode. Still further, the method comprises the photodiode receiving the subcarriers having blue wavelengths from the RBF, converting the subcarriers into an electromagnetic signal and outputting the electromagnetic signal to the SCDM device; and the SCDM device receiving the electromagnetic signal, demultiplexing the electromagnetic signal into at least two electromagnetic signals and outputting the at least two electromagnetic signals.

According to an aspect, a method performed by an optical distribution network comprising an OBT and at least two OFNs for sending and receiving signals between the OBT and the OFNs is provided. Each of the OBT and the OFNs comprises a respective transceiver comprises a transceiver comprising a Subcarrier Multiplexing, SCM, device; a laser diode; a Red-Blue Filter, RBF, having a red channel, a blue channel and a common channel; a Photo Diode, PD; and a Subcarrier Demultiplexing, SCDM device. The method comprises the SCM device receiving electromagnetic signals on at least two input ports, multiplexing the electromagnetic signals into a multiplexed electromagnetic signal and outputting the multiplexed electromagnetic signal to the laser diode. The method comprises the laser diode receiving the multiplexed electromagnetic signal, converting the multiplexed electromagnetic signal to optical signals comprising a plurality of subcarriers of different frequencies or wavelengths distributed in frequency around a main optical carrier, and outputting the plurality of subcarriers to the red channel of the RBF. The method further comprises the RBF receiving the plurality of subcarriers, and outputting the subcarriers to the fibre network via the common channel, the RBF further receiving subcarriers on the common channel and filtering out blue frequencies of the received subcarriers and outputting the subcarriers having blue frequencies to the photo diode. Still further, the method comprises the photodiode receiving the subcarriers having blue wavelengths from the RBF, converting the subcarriers into an electromagnetic signal and outputting the electromagnetic signal to the SCDM device; and the SCDM device receiving the electromagnetic signal, demultiplexing the electromagnetic signal into at least two electromagnetic signals and outputting the at least two electromagnetic signals.

The transceiver, the OBT, the OFN, the optical distribution and the respective method performed by the transceiver, the OBT, the OFN and the optical distribution may have several advantages. Each may enable efficient aggregation/multiplexing technique in downlink/uplink direction using SCM in downlink transmissions and WDM uplink transmissions for e.g. deep fibre penetration scenarios such as Fibre-To-the-Radio Head. The transceiver is simple and may be implemented in a node so that the node functions like a radio head and/or RoCu reach extension, i.e. converts from fibre to copper. The transceiver may also be used in both an arrangement in a central office and in an arrangement in a drop node within the fibre network. If used in a drop node, the drop node may further be extended with a fibre-span to radio head installed further from the fibre network.

BRIEF DESCRIPTION OF DRAWINGS

Embodiments will now be described in more detail in relation to the accompanying drawings, in which:

FIG. 6b is a block diagram of an illustrative example of the OFN of FIG. 6a.

DETAILED DESCRIPTION

Briefly described, a transceiver adapted for use in a fibre network and a method performed by the transceiver for transmitting and/or receiving signals on the fibre network are provided. Further, an Optical Backend Termination, OBT, and a method performed by the OBT being for sending and receiving signals to/from at least two Optical Frontend Nodes, OFNs, comprised in the fibre network are provided. Still further, an OFN and a method performed by the OFN for sending and receiving signals to/from an OBT are provided. Also an optical distribution network comprising an OBT and at least two OFNs and a method performed by the optical distribution network for transporting signals between the OBT and the OFNs are provided.

Figure 1A:
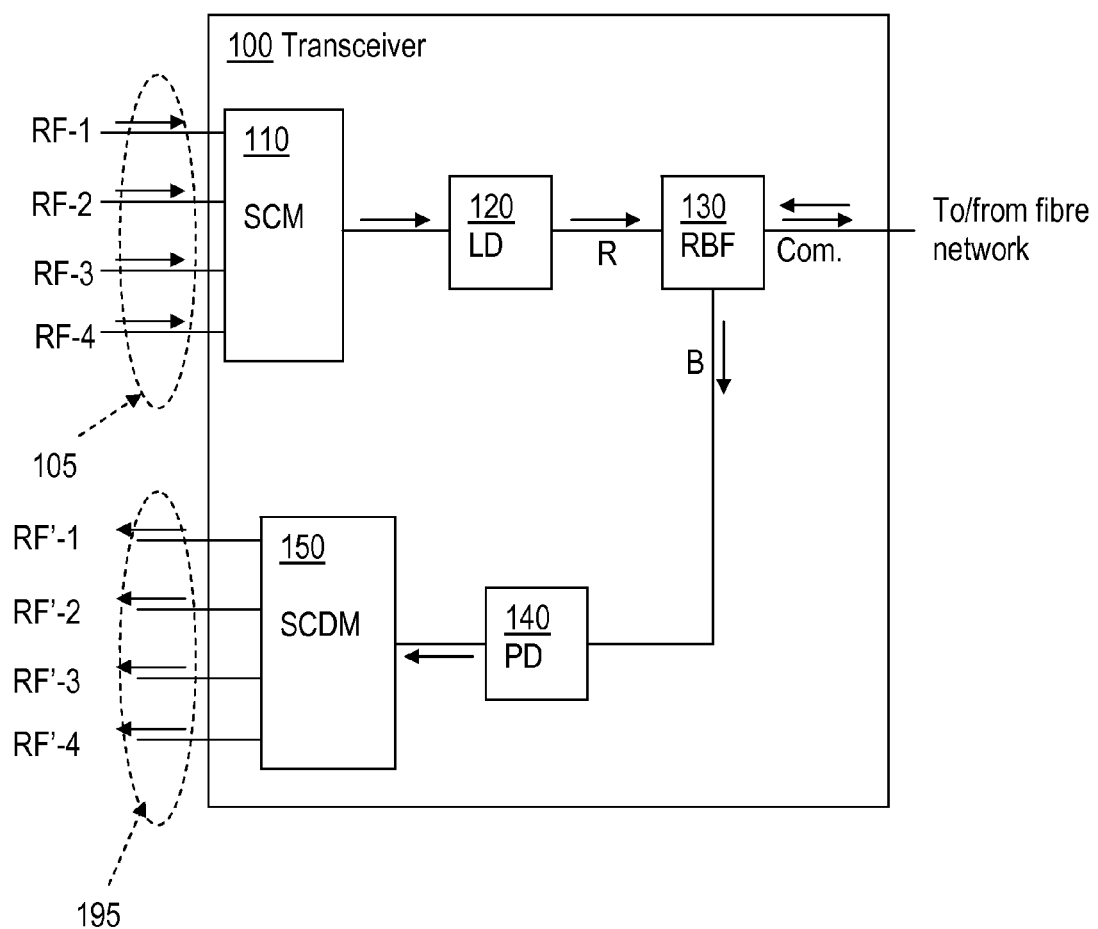
FIG. 1a is a block diagram of a transceiver adapted for use in a fibre network according to an exemplifying embodiment.

Exemplifying embodiments of such a transceiver adapted for transmitting and/or receiving signals on the fibre network will now be described with reference to FIG. 1a. FIG. 1a is a block diagram of a transceiver adapted for use in a fibre network according to an exemplifying embodiment.

FIG. 1a illustrates the transceiver comprising a Subcarrier Multiplexing, SCM, device 110; a laser diode 120; a Red-Blue Filter 130, RBF, having a red channel, a blue channel and a common channel; a Photo Diode 140, PD; and a Subcarrier Demultiplexing, SCDM device 150. The SCM device 110 comprises at least two input ports and one output port. The SCM device is adapted to receive electromagnetic signals on the at least two input ports, to multiplex the electromagnetic signals to a multiplexed electromagnetic signal and to output the multiplexed electromagnetic signal to the laser diode 120. The laser diode 120 is adapted to receive the multiplexed electromagnetic signal, to convert the multiplexed electromagnetic signal to optical signals comprising a plurality of subcarriers of different frequencies distributed in frequency around a main optical carrier and to output the plurality of wavelengths to the red channel of the RBF 130. The RBF 130 is adapted to receive the plurality of subcarriers, and to output the subcarriers to the fibre network via the common channel. The RBF 130 further is adapted to receive subcarriers on the common channel and to filter out blue frequencies of the received subcarriers and to output the subcarriers having blue wavelengths to the photo diode 140. The photodiode 140 is adapted to receive the subcarriers having blue wavelengths from the RBF, to convert the subcarriers into an electromagnetic signal and to output the electromagnetic signal to the SCDM device 150. The SCDM device 150 is adapted to receive the electromagnetic signal, to demultiplex the electromagnetic signal into at least two electromagnetic signals and to output the at least two electromagnetic signals.

FIG. 1a illustrates the SCM device 110 receiving four electromagnetic signals RF-1, RF-2, RF-3 and RF-4. It shall be pointed out that this is merely an example and the SCM device 110 may receive any number of electromagnetic signals from at least two. The SCM device 110 multiplexes the four received electromagnetic signals into one multiplexed electromagnetic signal comprising the four individual electromagnetic signals. The SCM device 110 outputs the multiplexed electromagnetic signal to the laser diode 120. The laser diode has a centre wavelength. When the laser diode converts the electromagnetic signal into the plurality of subcarriers of different frequencies (or wavelengths), the plurality of subcarriers of different frequencies become distributed in frequency around the main optical carrier which is determined by the centre wavelength. The frequencies or wavelengths of the plurality of subcarriers is determined both by the main or centre or main optical carrier and by the original electromagnetic signals that were received and multiplexed by the SCM device 110. The plurality of subcarriers of different frequencies is then outputted to the red channel of the RBF 130. The main or centre wavelength of the laser diode 110 may e.g. be selected such that the different frequencies of the plurality of subcarriers are within red frequencies of the RBF 130. Since the plurality of subcarriers are outputted from the laser diode 120 to the red channel of the RBF 130, the subcarriers would just be forwarded through the RBF 130 and outputted from the RBF onto the fibre network. Any subcarriers having frequencies or wavelengths other than red frequencies which are received by the RBF 130 may be blocked by the RBF 130 and not forwarded to the fibre network.

The RBF 130 is further adapted to receive subcarriers on the common channel and to filter out blue frequencies of the received subcarriers and to output the subcarriers having blue frequencies or wavelengths to the photo diode 140. The common channel is connected to the fibre network so any node or device on the fibre network may send optical signals, i.e. subcarriers, on the fibre network which are received by the RBF 130 of the transceiver. The RBF 130 thus filters out subcarriers having blue frequencies and output those to the photo diode 140. Any other frequencies, i.e. not blue frequencies, received by the RBF 130 may be blocked by the RBF 130. The photo diode 140 then converts the subcarriers into an electromagnetic signal. The photo diode 140 can thus be said to do a reverse action compared to the laser diode 120. The electromagnetic signal may comprise a plurality of different electromagnetic signals that are multiplexed into one electromagnetic signal. The photo diode 140 outputs the electromagnetic signal to the SCDM device 150. The SCDM device 150 is adapted to receive the electromagnetic signal, to demultiplex the electromagnetic signal into at least two electromagnetic signals and to output the at least two electromagnetic signals. In FIG. 1a, the SCDM device 150 is illustrated in FIG. 1a to demultiplex the electromagnetic signal received from the photo diode 140 into four electromagnetic signals RF'-1, RF'-2, RF'-3 and RF'-4. The example illustrated in FIG. 1a enables one to four devices (not shown) sending electromagnetic signals RF-1, RF-2, RF-3 and RF-4 to a node or device connected to the fibre network by means of the transceiver. The example further illustrates the not shown devices receiving four electromagnetic signals RF'-1, RF'-2, RF'-3 and RF'-4 from a node or device connected to the fibre network by means of the transceiver.

The transceiver may have several advantages. It may enable efficient aggregation/multiplexing technique in downlink/uplink direction using SCM in downlink transmissions and WDM uplink transmissions for e.g. deep fibre penetration scenarios such as Fibre-To-the-Radio Head. The transceiver is simple and may be implemented in a node so that the node functions like a radio head and/or RoCu reach extension, i.e. converts from fibre to copper. The transceiver may also be used in both an arrangement in a central office and in an arrangement in a drop node within the fibre network. If used in a drop node, the drop node may further be extended with a fibre-span to radio head installed further from the fibre network.

According to an embodiment, the transceiver is implemented in an Optical Backend Termination, OBT, the OBT being adapted to send and receive signals to/from at least two Optical Frontend Nodes, OFNs, comprised in the fibre network, the OBT further comprising at least two photo diodes 140 and a Wavelength Division Demultiplexing, WDM-DEMUX, device 160 arranged between RBF 130 and the photo diodes 140 by having an input of the Wavelength Division Demultiplexing device 160 connected to the blue channel of the RBF 130 and having at least two outputs, each output connectable to a respective photo diode 140.

The OBT is adapted to communicate with, i.e. sending and/or receiving signals to/from, at least two OFNs. This means that the OBT will receive pluralities of subcarriers from at least two OFNs which are multiplexed wavelengthwise and must then, when they are received perform a WDM demultiplexing operation. This is performed by the WDM-DEMUX device 160. The WDM-DEMUX device 160 is adapted to receive pluralities of subcarriers from the RBF 130 on an input of the WDM-DEMUX device 160. The WDM-DEMUX device 160 has at least as many outputs as there are OFNs on the fibre network from which the OBT may receive signals from. The outputs of the WDM-DEMUX device 160 are connected to individual photodiodes 140 which each converts a plurality of subcarriers of different frequencies to individual electromagnetic signals. The electromagnetic signals are then outputted from the respective photodiodes 140 and inputted to a respective SCDM 150. It shall be pointed out that there is one SDCM 150 for each photodiode 140 even if this is not illustrated in FIG. 1b.

In this manner, devices or nodes connected to the OBN via the SCM 110 and the SCDM 150 may communicate with a plurality of nodes or device connected to the OFNs via the fibre network to which the OBT is connected. The transceiver enables SCM in downlink transmissions and WDM uplink transmissions.

According to still an embodiment, the transceiver further comprises at least two SCM devices 110 and at least two laser diodes 120, wherein the transceiver further comprises a Wideband Division Multiplexing, WDM, device 170 arranged between the respective laser diodes and the RFB, the WDM having at least two inputs connected to a respective laser diode and an output connected to the red channel of the RBF, wherein the WDM device is arranged to multiplex received subcarriers and to output the multiplexed subcarriers to the RBF.

Figure 1B:
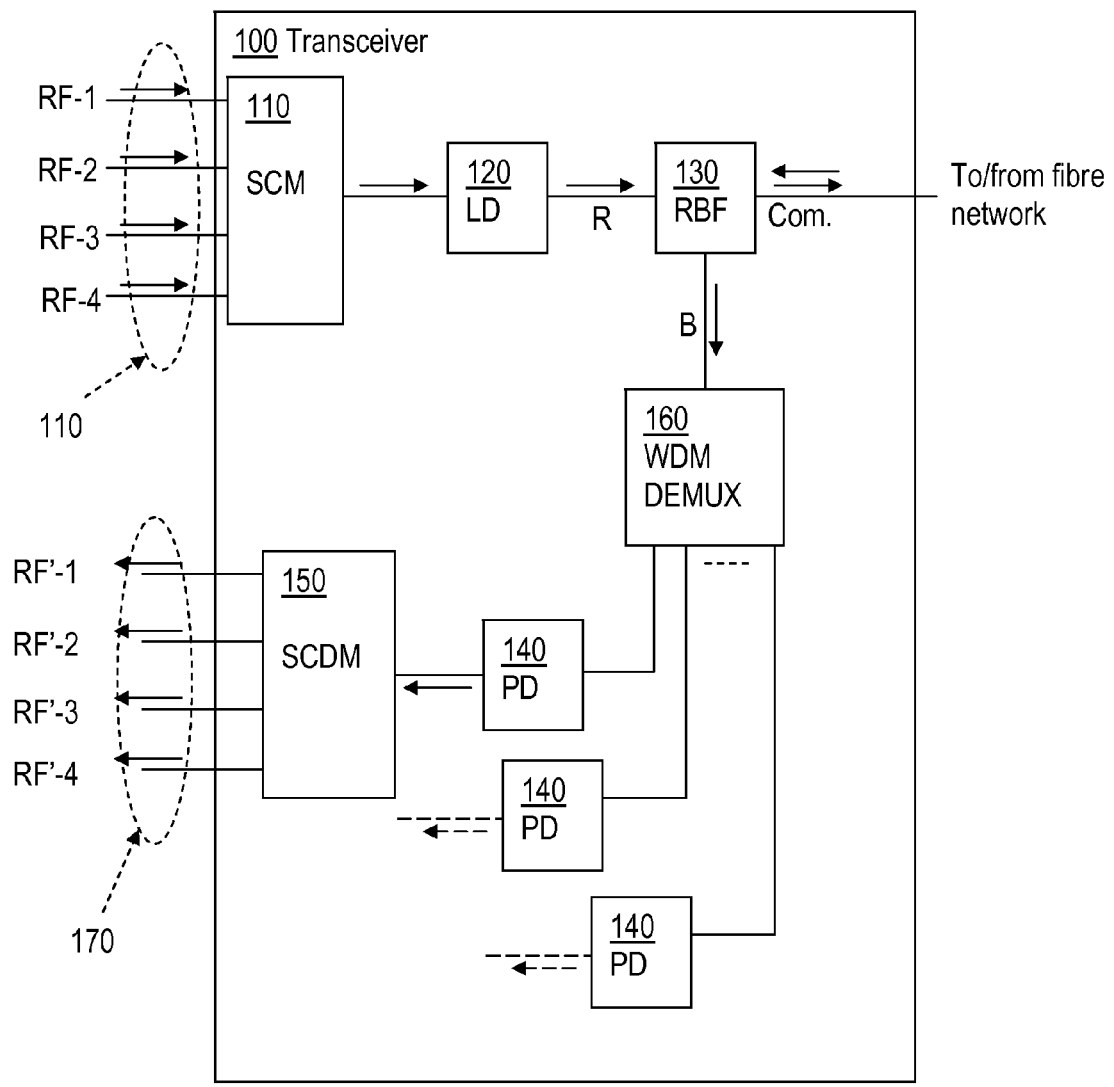
FIG. 1b is a block diagram of a transceiver being implemented in an Optical Backend Termination, OBT, the OBT being adapted to send and receive signals to/from at least two Optical Frontend Nodes, OFNs, comprised in the fibre network, i.e. employing SCM in downlink and WDM in uplink.
Figure 1C:
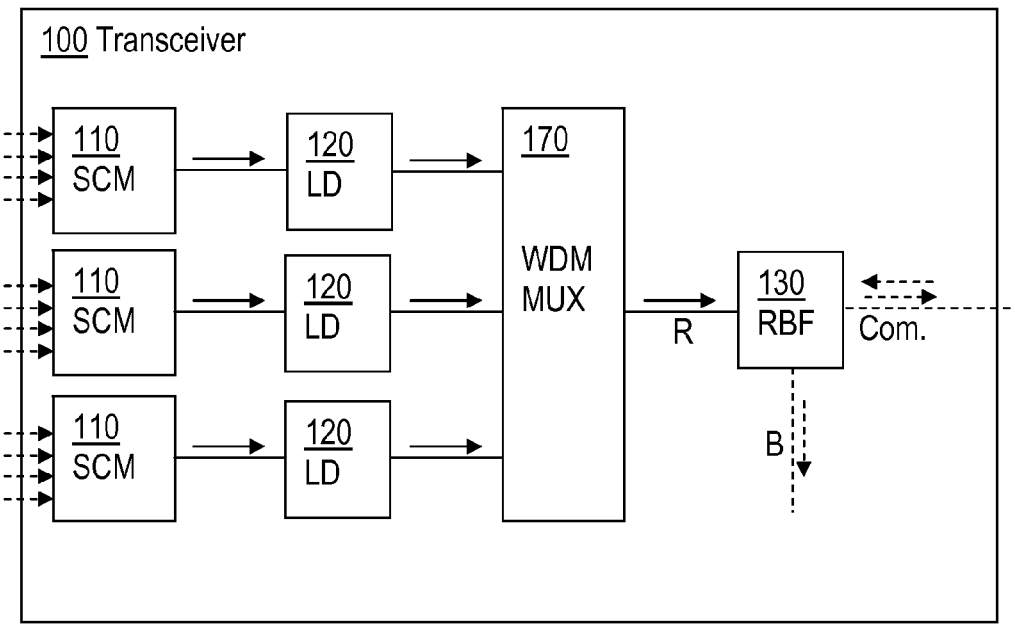
FIG. 1c is a block diagram of a transceiver being implemented in an OBT for employing WDM in downlink.

FIG. 1c is a block diagram of a transceiver being implemented in an OBT for employing WDM in downlink. FIG. 1c illustrates the transceiver comprising three, i.e. at least two, SCM devices 110. The individual SCMs 110 may receive a plurality of electromagnetic signals. Each of the SCMs 110 is connected to an individual laser diode 120 so that each SCM receives a plurality of electromagnetic signals which they multiplex to individual multiplexed electromagnetic signals. In the illustrative example of FIG. 1c, all the received electromagnetic signals are multiplexed by the three SCMs 110 to three individual multiplexed electromagnetic signals which are outputted to three individual laser diodes 120. The three laser diodes 120 then converts the received three individual multiplexed electromagnetic signals to three individual pluralities of subcarriers of different frequencies or wavelengths. The three laser diodes 120 could have different main, or centre, wavelengths so that each individual laser diode 120 outputs a plurality of subcarriers of different wavelengths around its own main, or centre, frequency. This means that the WDM-MUX 170 receives three pluralities of subcarriers of different frequencies, which the WDM-MUX 130 then multiplexes wavelength-wise to one signal which the WDM-MUX 170 outputs to the RBF 130 to be received by the RBF 130 via its red channel.

In this manner, the transceiver is used in an OBN employing WDM in downlink.

According to an embodiment, the transceiver is implemented in an OFN, the OFN being comprised in the fibre network and connected to an OBT also comprised in the fibre network, the transceiver further comprising a Band Pass Filter 180, BPF, arranged between the RBF 130 and the photo diode 140 by having an input connected to a blue channel of the RBF 130 and an output connected to the photo diode.

Figure 1D:
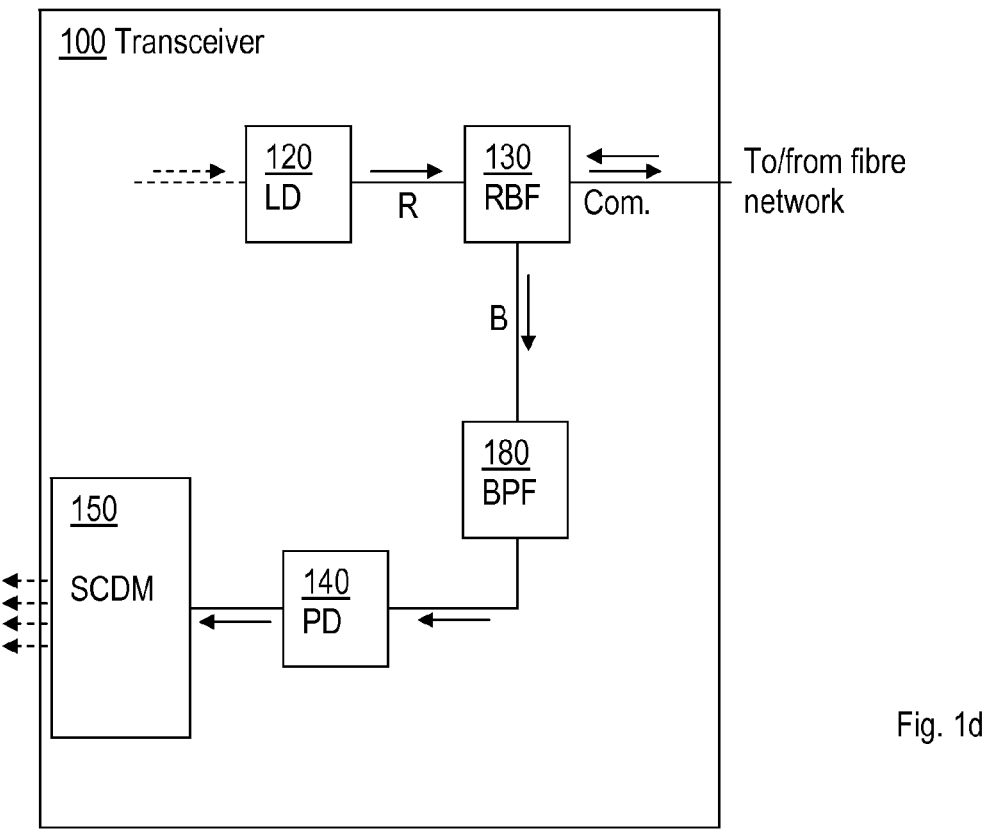
FIG. 1d is a block diagram of a transceiver being implemented in an Optical Frontend Node, OFN for receiving signals via a fibre network.

FIG. 1d is a block diagram of a transceiver being implemented in an Optical Frontend Node, OFN for receiving signals via a fibre network. It shall be pointed out that the transceiver illustrated in FIG. 1d may also comprise an SCM 110 even if not illustrated in FIG. 1d. The transceiver receives optical signals from the fibre network and the optical signals are received by the RBF 130 on its common channel. The RBF forwards the received optical signal via its blue channel to the BPF 180. The BPF 18 performs a filtering of the signal so that only optical signals having a wavelength or frequency within a predefined bandwidth are allowed to pass through the BPF 180. Any optical signals received having a wavelength or frequency outside the predefined bandwidth will not be outputted by the BFP 180. The optical signals that are forwarded, i.e. passes through the BPF 180, are outputted to the photo diode 140 to be converted into an electromagnetic signal, which is then outputted from the photo diode 140 to the SCDM device 150. The SCDM device 150 demultiplexes the received electromagnetic signal into a plurality of different electromagnetic signals, as explained above.

The BPF 180 may be realised in different ways. In an example it is a tuneable band pass filter. In another example, it comprises a Wavelength Division Demultiplexer having an input connected to the blue channel of the RBF 130 and only maximum all but one of its outputs connected to the photo diode 140 thus filtering out wavelengths of those outputs not being connected to the photo diode 140.

Embodiments herein also relate to an OBT operable to be comprised in a fibre network, the OBT being adapted to send and receive signals to/from at least two Optical Frontend Nodes, OFNs, comprised in the fibre network. Exemplifying embodiments of such an OBT will now be described with reference to FIG. 2a.

Figure 2A:
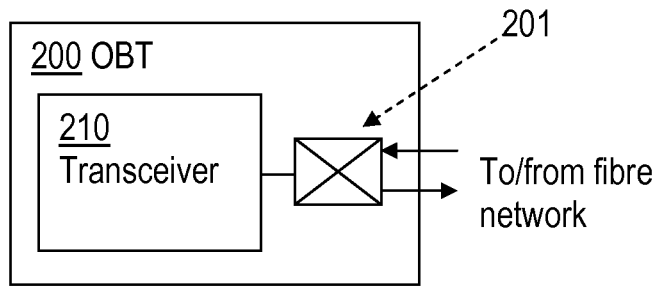
FIG. 2a is a block diagram of an OBT comprising a transceiver.

FIG. 2a illustrates the OBT 200 further comprising a transceiver 210. The transceiver 210 may be any transceiver as described above in conjunction with FIGS. 1a, 1b and 1c.

The OBT 200 is also illustrated comprising a switching arrangement 201 for connecting the OBT 200 to the fibre network. Comparing FIGS. 1a, 1b and 1c with FIG. 2a, the common channel of the RBF 130 according to FIGS. 1a, 1b and 1c is connected to the fibre network via the switching arrangement 201 of the OBT. It shall be pointed out that the switching arrangement 201 may alternatively be connected to the OBT as an alternative to be comprised in the OBT.

Figure 2B:
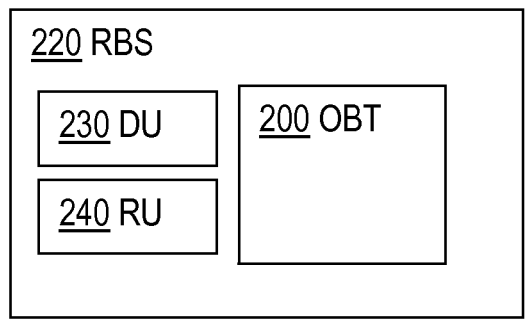
FIG. 2b is a block diagram of an RBS comprising an OBT.

The OBT 200 in turn may be comprised in a Radio Base Station 220, RBS, or a central office. FIG. 2b illustrates an example when the OBT further is incorporated into an RBS. Comparing FIGS. 2a and 2b, it shall be noted that the switching arrangement 201 of FIG. 2a is assumed to be comprised in the OBT 200. Alternatively, the switching arrangement 201 may be comprised in the RBS and connected to the OBT 200 and the fibre network.

The OBT may have the same several advantages as the transceiver. It may enable efficient aggregation/multiplexing technique in downlink/uplink direction using SCM in downlink transmissions and WDM uplink transmissions for e.g. deep fibre penetration scenarios such as Fibre-To-the-Radio Head. The transceiver is simple and may be implemented in a node so that the node functions like a radio head and/or RoCu reach extension, i.e. converts from fibre to copper. The transceiver may also be used in both an arrangement in a central office and in an arrangement in a drop node within the fibre network. If used in a drop node, the drop node may further be extended with a fibre-span to radio head installed further from the fibre network.

Embodiments herein also relate to an Optical Frontend Node, OFN, operable to be comprised in a fibre network, the OFN being adapted to send and receive signals to/from an OBT. Exemplifying embodiments of such an OFN will now be described with reference to FIG. 3.

Figure 3:
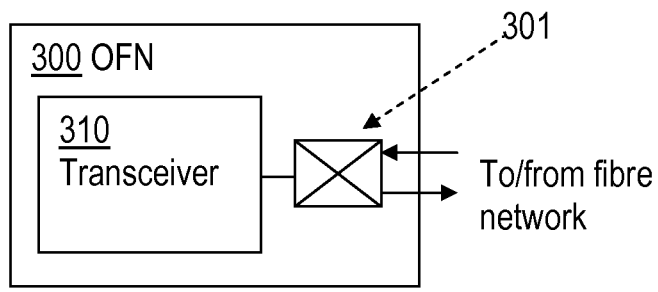
FIG. 3 is a block diagram of an OFN comprising a transceiver.

FIG. 3 illustrates the OFN 300 further comprising a transceiver 310. The transceiver 310 may be any transceiver as described above in conjunction with FIGS. 1a and 1d.

The OFN 300 is also illustrated comprising a switching arrangement 301 for connecting the OFN 300 to the fibre network. Comparing FIGS. 1a and 1d with FIG. 3, the common channel of the RBF 130 according to FIGS. 1a and 1d is connected to the fibre network via the switch 301 of the OFN. It shall be pointed out that the switching arrangement 301 may alternatively be connected to the OFN as an alternative to be comprised in the OFN.

The OFN may have the same several advantages as the transceiver. It may enable efficient aggregation/multiplexing technique in downlink/uplink direction using SCM in downlink transmissions and WDM uplink transmissions for e.g. deep fibre penetration scenarios such as Fibre-To-the-Radio Head. The transceiver is simple and may be implemented in a node so that the node functions like a radio head and/or RoCu reach extension, i.e. converts from fibre to copper. The transceiver may also be used in both an arrangement in a central office and in an arrangement in a drop node within the fibre network. If used in a drop node, the drop node may further be extended with a fibre-span to radio head installed further from the fibre network Embodiments herein also relate to an Optical Distribution Network comprising an OBT according to FIG. 2a and at least two OFNs according to FIG. 3.

Figure 4A:
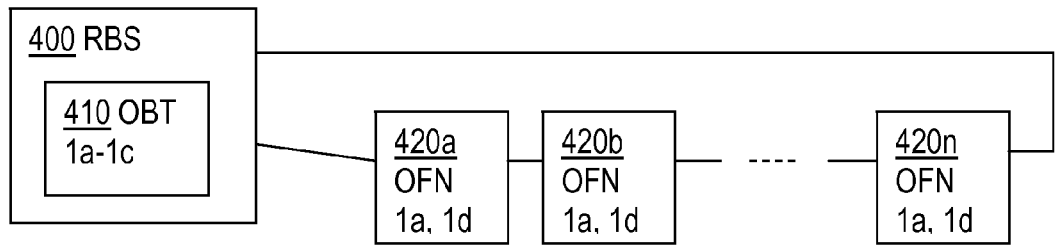
FIG. 4a is a block diagram of an exemplifying embodiment of Optical Distribution Network.
Figure 4B:
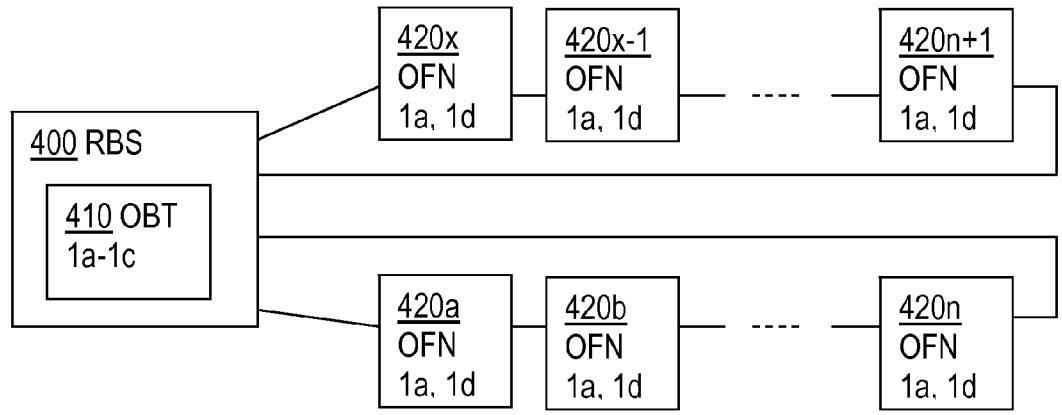
FIG. 4b is a block diagram of another exemplifying embodiment of Optical Distribution Network.

FIGS. 4a and 4b are block diagrams of exemplifying embodiments of Optical Distribution Network. In FIG. 4a, the RBS 400, which alternatively may be a central office, comprises an OBT 410a. The OBT 410a corresponds to the OBT 200 illustrated in 2a, with the switching arrangement 201 either comprised in the OBT 200 or being connected to the OBT 200. The OBT 200 further comprises a transceiver 210 which corresponds to any of the embodiments described in conjunction with FIGS. 1a, 1b and 1c.

FIG. 4a further illustrates that the RBS 400 is connected, via the fibre network, to a plurality of OFNs, 420a, 420b, . . . , 420n. The respective OFN corresponds to the OFN 300 illustrated in FIG. 3. The OFN 300 comprises a transceiver 310 corresponds to any of the embodiments of the transceiver described in conjunction with FIGS. 1a and 1d.

In the Optical Distribution Network illustrated in FIG. 4a, electromagnetic signals received from devices (not shown) connected to the RBS 400 will be received by the transceiver comprised in the OBT which is comprised in the RBS. The transceiver will convert the electromagnetic signals into optical signals, i.e. subcarriers, and transmit them on the fibre networks towards the OFNs420a, 420b, . . . , 420n. The respective OFNs will receive the optical signals and convert them to electromagnetic signals to be forwarded, or transmitted to, devices (not shown) connected to the respective OFNs.

FIG. 4b illustrates that the Optical Distribution Network may comprise individual fibre networks all supported by the same RBS 400.

The optical distribution network may have the same several advantages as the transceiver. It may enable efficient aggregation/multiplexing technique in downlink/uplink direction using SCM in downlink transmissions and WDM uplink transmissions for e.g. deep fibre penetration scenarios such as Fibre-To-the-Radio Head. The transceiver is simple and may be implemented in a node so that the node functions like a radio head and/or RoCu reach extension, i.e. converts from fibre to copper. The transceiver may also be used in both an arrangement in a central office and in an arrangement in a drop node within the fibre network. If used in a drop node, the drop node may further be extended with a fibre-span to radio head installed further from the fibre network.

Embodiments herein also relate to a method performed by a transceiver for use in a fibre network, the transceiver comprising a SCM device; a laser diode; an RBF having a red channel, a blue channel and a common channel; a Photo Diode, and an SCDM device. The method performed by the transceiver has the same technical features, advantages and objects as the transceiver described above. The method performed by the transceiver will only be described in brief in order to avoid unnecessary repetition.

Figure 5:
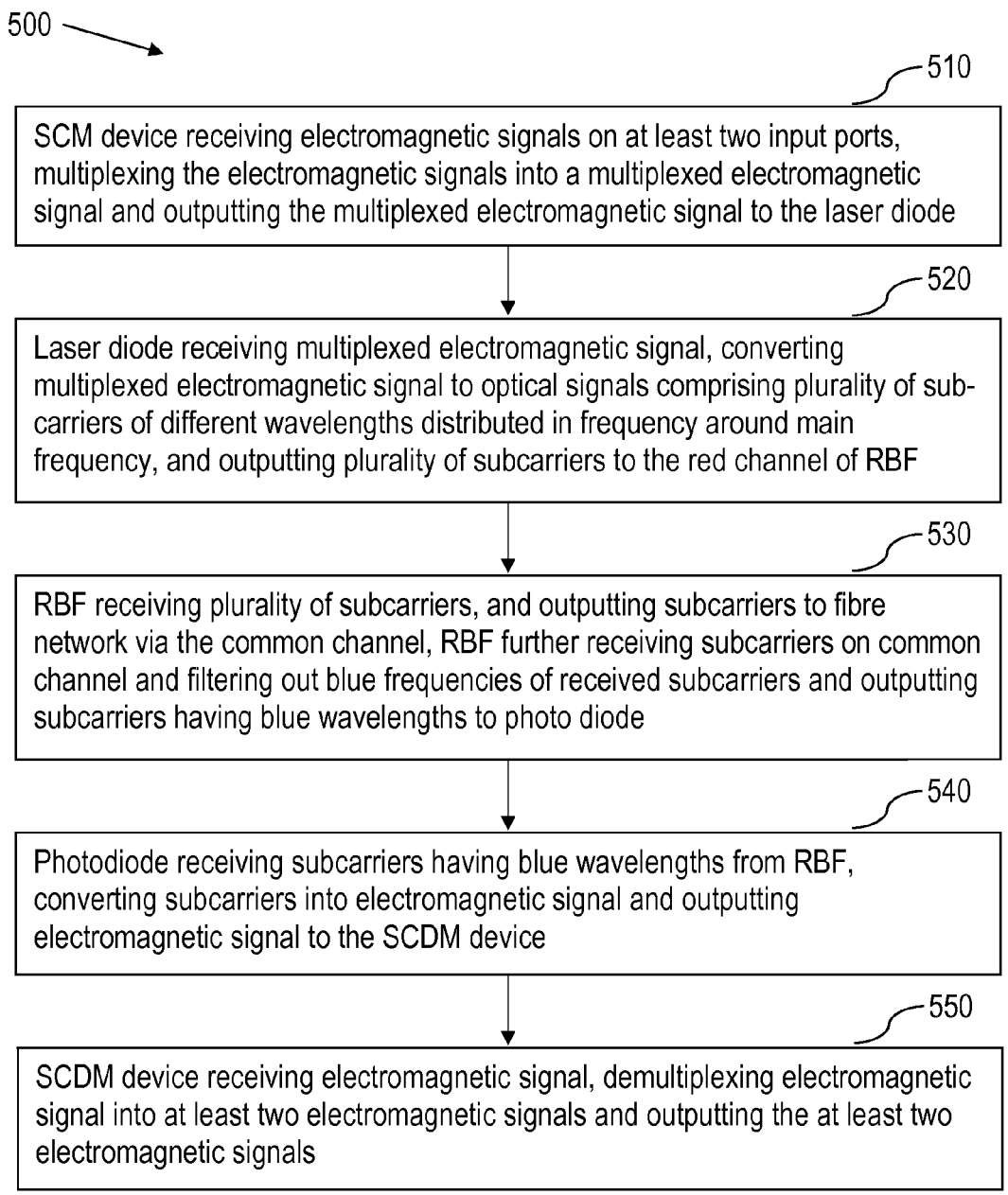
FIG. 5 is a flowchart of a method performed by a transceiver according to an exemplifying embodiment.

FIG. 5 is a flowchart of a method 500 performed by the transceiver according to an exemplifying embodiment. FIG. 5 illustrates the method comprising the SCM device receiving 510 electromagnetic signals on at least two input ports, multiplexing the electromagnetic signals into a multiplexed electromagnetic signal and outputting the multiplexed electromagnetic signal to the laser diode. The method comprises the laser diode receiving 520 the multiplexed electromagnetic signal, converting the multiplexed electromagnetic signal to optical signals comprising a plurality of subcarriers of different frequencies or wavelengths distributed in frequency around a main optical carrier, and outputting the plurality of subcarriers to the red channel of the RBF. The method further comprises the RBF receiving 530 the plurality of subcarriers, and outputting the subcarriers to the fibre network via the common channel, the RBF further receiving subcarriers on the common channel and filtering out blue frequencies of the received subcarriers and outputting the subcarriers having blue frequencies to the photo diode. Still further, the method comprises the photodiode receiving 540 the subcarriers having blue wavelengths from the RBF, converting the subcarriers into an electromagnetic signal and outputting the electromagnetic signal to the SCDM device; and the SCDM device receiving 550 the electromagnetic signal, demultiplexing the electromagnetic signal into at least two electromagnetic signals and outputting the at least two electromagnetic signals.

The method performed by the transceiver may have same several advantages as the transceiver itself. It may enable efficient aggregation/multiplexing technique in downlink/uplink direction using SCM in downlink transmissions and WDM uplink transmissions for e.g. deep fibre penetration scenarios such as Fibre-To-the-Radio Head. The transceiver is simple and may be implemented in a node so that the node functions like a radio head and/or RoCu reach extension, i.e. converts from fibre to copper. The transceiver may also be used in both an arrangement in a central office and in an arrangement in a drop node within the fibre network. If used in a drop node, the drop node may further be extended with a fibre-span to radio head installed further from the fibre network.

According to an embodiment, the transceiver is implemented in an Optical Backend Termination, OBT, the OBT sending and receiving signals to/from at least two Optical Frontend Nodes, OFNs, comprised in the fibre network, the OBT further comprising at least two photo diodes and a Wavelength Division Demultiplexing device arranged between RBF and the photo diodes by having an input of the Wavelength Division Demultiplexing device connected to the blue channel of the RBF and having at least two outputs, each output connectable to a respective photo diode.

According to an embodiment, the transceiver further comprises at least two SCM devices and at least two laser diodes, wherein the transceiver further comprises a Wideband Division Multiplexing, WDM, device arranged between the respective laser diodes and the RFB, the WDM having at least two inputs connected to a respective laser diode and an output connected to the red channel of the RBF, wherein the method comprises the WDM device multiplexing received subcarriers and outputting the multiplexed subcarriers to the RBF.

According to still an embodiment, the transceiver is implemented in an OFN, the OFN being comprised in the fibre network and connected to an OBT, also comprised in the fibre network, the transceiver further comprising a BPF, arranged between the RBF and the photo diode by having an input connected to a red channel of the RBF and an output connected to the photo diode.

Embodiments herein also relate to a method performed by an OBT operable to be comprised in a fibre network, for sending and receiving signals to/from at least two Optical Frontend Nodes, OFNs, comprised in the fibre network, the OBT further comprising a transceiver as described in conjunction with FIGS. 1a, 1b and 1c adapted to perform the method described in conjunction with FIG. 5.

The method performed by the OBT has the same several advantages as the OBT itself. It may enable efficient aggregation/multiplexing technique in downlink/uplink direction using SCM in downlink transmissions and WDM uplink transmissions for e.g. deep fibre penetration scenarios such as Fibre-To-the-Radio Head. The transceiver is simple and may be implemented in a node so that the node functions like a radio head and/or RoCu reach extension, i.e. converts from fibre to copper. The transceiver may also be used in both an arrangement in a central office and in an arrangement in a drop node within the fibre network. If used in a drop node, the drop node may further be extended with a fibre-span to radio head installed further from the fibre network.

Embodiments herein also relate to a method performed by an OFN operable to be comprised in a fibre network, for sending and receiving signals to/from an Optical Backend Termination, OBT, the OFN further comprising a transceiver as described in conjunction with FIGS. 1a and 1d adapted to perform the method described in conjunction with FIG. 5.

The method performed by the OFN has the same several advantages as the OFN itself. It may enable efficient aggregation/multiplexing technique in downlink/uplink direction using SCM in downlink transmissions and WDM uplink transmissions for e.g. deep fibre penetration scenarios such as Fibre-To-the-Radio Head. The transceiver is simple and may be implemented in a node so that the node functions like a radio head and/or RoCu reach extension, i.e. converts from fibre to copper. The transceiver may also be used in both an arrangement in a central office and in an arrangement in a drop node within the fibre network. If used in a drop node, the drop node may further be extended with a fibre-span to radio head installed further from the fibre network.

Embodiments herein also relate to a method performed by an Optical Distribution Network comprising an OBT described in conjunction with FIG. 2a adapted to perform the method described in conjunction with FIG. 5 and at least two OFNs described in conjunction with FIG. 3 adapted to perform the method described in conjunction with FIG. 5.

The method performed by the Optical Distribution Network has the same several advantages as the Optical Distribution Network itself. It may enable efficient aggregation/multiplexing technique in downlink/uplink direction using SCM in downlink transmissions and WDM uplink transmissions for e.g. deep fibre penetration scenarios such as Fibre-To-the-Radio Head. The transceiver is simple and may be implemented in a node so that the node functions like a radio head and/or RoCu reach extension, i.e. converts from fibre to copper. The transceiver may also be used in both an arrangement in a central office and in an arrangement in a drop node within the fibre network. If used in a drop node, the drop node may further be extended with a fibre-span to radio head installed further from the fibre network.

The solution described above may be implemented in the optical backhaul/fronthaul architecture described as Fibre To The Radio head (FTTRh). The Radio Head (RH) may be connected with a short coaxial cable to an external antenna or RH and antenna may compose a single unit. On top of that, RH can be integrated into the optical node placed in the fibre ring structure or a fibre can stretch from the optical node via drop link to the RH. Finally, the RH can be connected via a copper cable using Radio-over-Copper (RoCu) transmission to the optical node installed in the ring and equipped with proper Copper-to-Fibre conversion capability. In principle different mixes of the above are also possible.

The above described solution may be implemented in e.g. WDM/SCM aggregation technique in downstream/downlink direction combined with WDM/SCM aggregation in upstream/uplink direction. The solution may also be implemented in Radio-over-Fibre as the link technology; ring architecture with simple switch function for reliability; and low-complexity optical node architecture for bidirectional operation.

Reverting to FIGS. 4a and 4b, embodiments of the transceiver may be implemented in different nodes in an optical distribution network. FIGS. 4a and 4b illustrate an RBS situated in a centralised location such as RBS hotel or Central Office (CO). It is connected to two branches of a trunk fibre ring. The ring connects several optical nodes which may be equipped with two in/through optical ports, and an internal add-drop path which connects to an antenna unit (possibly all integrated in a single enclosure).

Transmission in downstream/downlink direction is provided via SCM. Depending on the actual application scenario one or more subcarriers can be dropped at every OFN. However, subcarriers are not shared across OFNs.

Transmission in upstream/uplink direction is provided via WDM. This means that every OFN may add its unique wavelength channel to the ring. For multi-operator scenario one could provide also SCM on top of each WDM carrier.

Figure 6A:
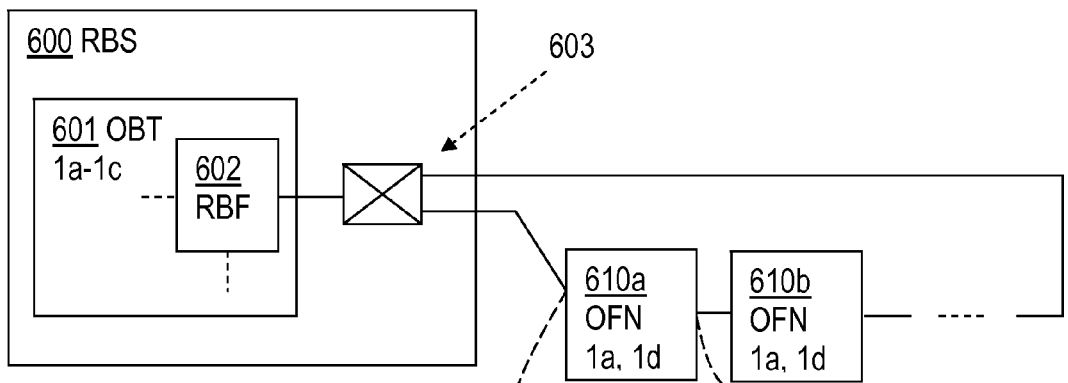
FIG. 6a is a block diagram of an illustrative example of an optical distribution network comprising an RBS and OFNs.

FIG. 6a is a block diagram of an illustrative example of an optical distribution network comprising an RBS 600 and OFNs. In the RBS 600, electromagnetic interfaces may be connected to so called Radio-over-fibre Master units which could be organized in line cards. Each such line card may also be referred to as an OBT 601, which could be directly connected to a bus of an optical distribution network or via an optical switch 603 to a ring of an optical distribution network. A possible solution for a wavelength independent switch 603 is actually a 1:2 coupler with adjustable split-ratio which may vary from 0/100 to 100/0 continuously. In FIG. 6a, the OBT 601 is illustrated comprising an RBF 602, corresponding to the RBF 130 of FIGS. 1a-1d. The OBT 601 comprises also other components as described above, but only the RBF 602 is illustrated for simplicity, and the RBF 602 is connected to the switch 603.

In case of a fibre break in the ring the switch 603 enables transmission/reception from different arms of the ring or both at a time depending on the actual location of the fibre fault. This helps to avoid node outage. The optical part of an OBT comprises transmitter and receiver blocks. The transmitter is based on a laser (DML or externally modulated one, i.e. the laser diode described above) which output signal is put through the RBF 602 towards the switch 603. The other port of the RBF 602 send the upstream signal via a wavelength demultiplexer to a set of optical receivers dedicated for each wavelength channel. On electrical side the laser diode and the photo diode are equipped with sub-carrier multiplexers and demultiplexers, respectively as described above.

Figure 6B:
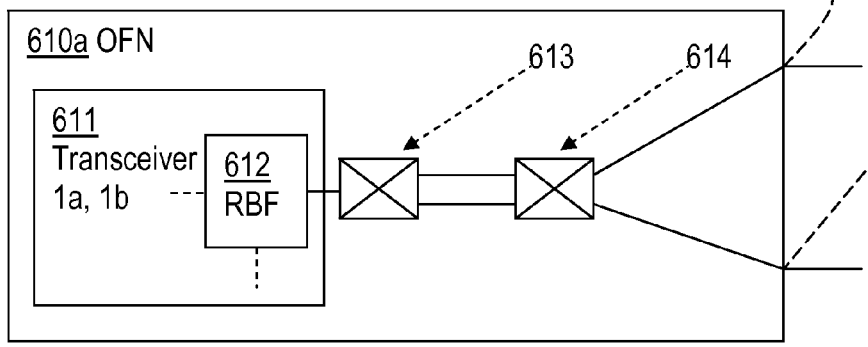

FIG. 6b is a block diagram of an illustrative example of the OFN 610 of FIG. 6a.

The transmitter block (not shown) in the OFN 610 is similarly built as its equivalent in the OBT 601 but with lower count of subcarriers. It operates at a dedicated wavelength. A cost-efficient solution could be a Coarse Wavelength Division Multiplexing Vertical Cavity Surface Emitting Laser, CWDM VCSEL. To make the OFN 610 completely colourless an array of CWDM VCSELs could be provided. For more demanding scenarios tuneable laser diode could be a solution. The signal from the transmitter is coupled to the Blue channel of the RBF 612. The blue channel of RBF 612 is connected to the photo diode (not shown) followed by SCM demultiplexer (not shown). A common channel of RBF 612 is connected to a 1:2 50/50 coupler 613 which divides the upstream signal equally in power and sends the signal via a 2:2 asymmetric coupler 614 to the branches of the ring. The asymmetric splitter 614 provides e.g. a 10/90 split ratio as an example. This split-ratio could actually be different depending on the available power budget (laser diode and photo diode parameters). The through-path of the OFN 610 is provided by the two high power branches of the asymmetric splitter. It introduces minor (~1 dB) attenuation to the trough signals. The RBF 612 to coupler connection can be extended with a fibre span. This would enable moving an Opto/Electro, O/E, part of the OFN 610 further away from the ring if deeper P2P fibre penetration is required or possible.

The downstream and upstream optical signal pair travels over the same optical link in counter directions and, therefore, experiences the same link loss.

Figure 7A:
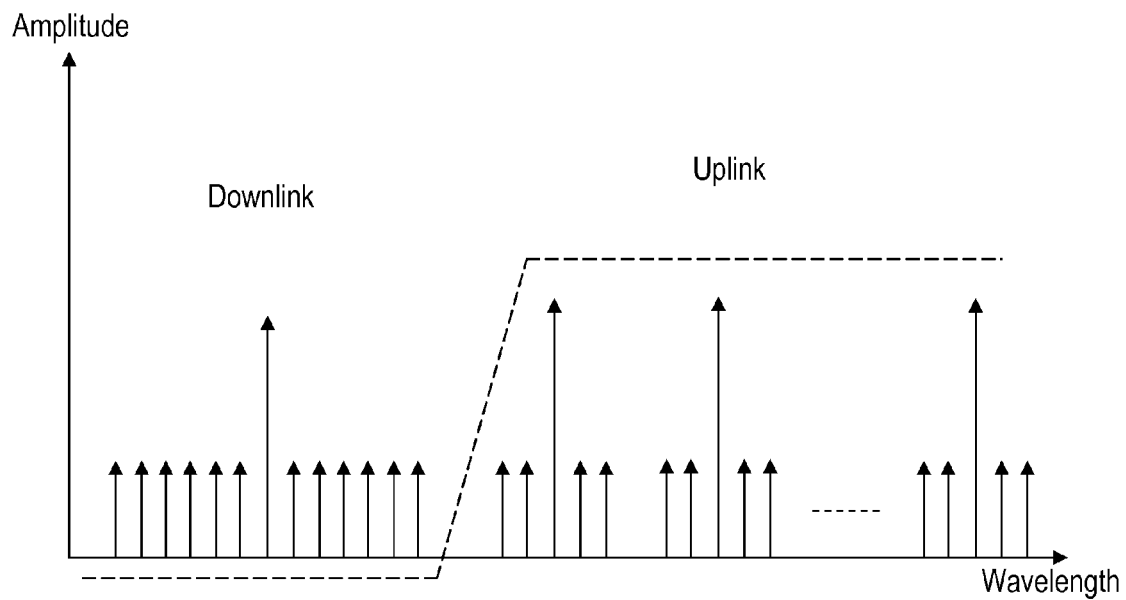
FIG. 7a is an illustration of a wavelength panel for uplink and downlink transmission together with an RBF profile (dotted line) in a Sub-Carrier Multiplexing, SCM, downlink transmission and a Wavelength Division Multiplex, WDM, uplink transmission.
Figure 7B:
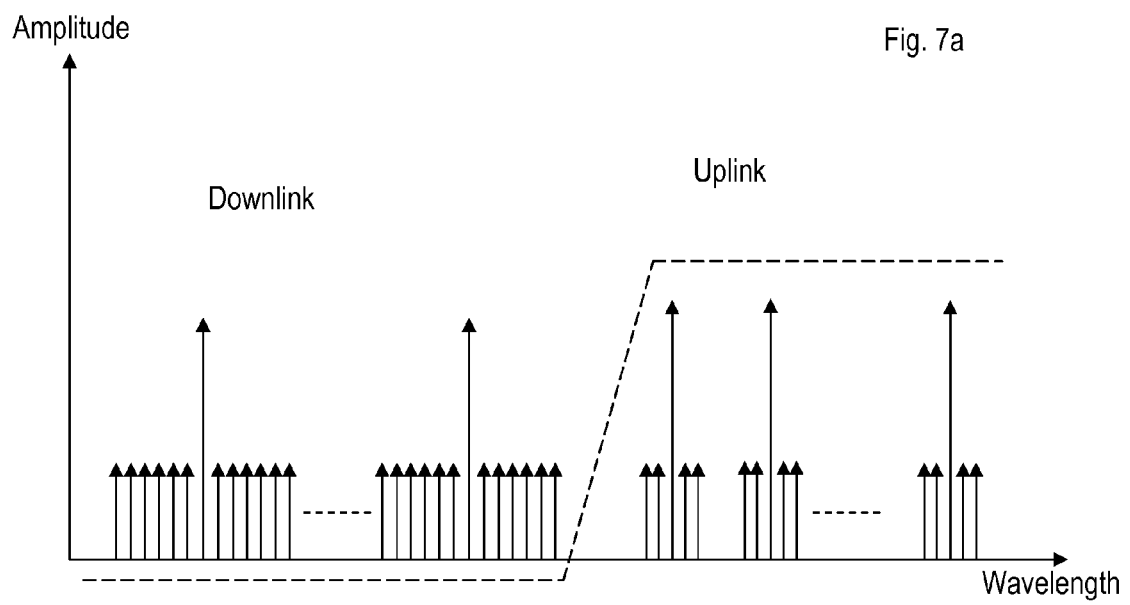
FIG. 7b is an illustration of a wavelength panel for uplink and downlink transmission together with an RBF profile (dotted line) in a WDM downlink transmission and a WDM uplink transmission.

FIG. 7 is an illustration of a wavelength panel for uplink and downlink transmission together with an RBF profile (dotted line). In FIG. 7, it is illustrated how the RBF may be used for downlink and uplink transmissions.

Potential leakage of the upstream/uplink signals between the OFNs may be prevented either by laser diode front-facet isolation or additional optical isolator that may be included between the B-blue channel of the RBF and laser diode in the OFNs.

Looking at FIGS. 4a and 4b, the number of photo diodes (or output ports in the WDM demultiplexer) in OBT determines the maximum number of OFNs. In order to provide cost-efficient solution with cheap optics (CWDM) but with high number of OFNs, more OBT line cards may be provided in the RBS each addressing different (longer) fibre reach.

In case of multi-wavelength transmission in downstream, besides proper set of transmitters and receivers, which could be e.g. VCSEL arrays an extra optical Band Pass Filter is needed as illustrated in FIG. 1d. It should be placed at the OFN receiver. In case of a bus architecture the same filtering can be achieved with edge-shifted RBF.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A transceiver adapted for use in a fibre network, the transceiver comprising a Subcarrier Multiplexing, SCM, device; a laser diode; a Red-Blue Filter, RBF, having a red channel, a blue channel and a common channel; a photo diode, PD; and a Subcarrier Demultiplexing, SCDM, device, wherein the SCM device comprises at least two input ports and one output port, the SCM device being adapted to receive electromagnetic signals on the at least two input ports, to multiplex the electromagnetic signals into a multiplexed electromagnetic signal and to output the multiplexed electromagnetic signal to the laser diode, the laser diode being adapted to receive the multiplexed electromagnetic signal, to convert the multiplexed electromagnetic signal to optical signals comprising a plurality of subcarriers of different wavelengths distributed in frequency around a main optical carrier, and to output the plurality of subcarriers to the red channel of the RBF, the RBF being adapted to receive the plurality of subcarriers, and to output the plurality of subcarriers to the fibre network via the common channel, the RBF further being adapted to receive subcarriers on the common channel and to filter out blue frequencies of the received subcarriers and to output subcarriers having blue wavelengths to the photo diode, the photo diode being adapted to receive the subcarriers having blue wavelengths from the RBF, convert the received subcarriers having blue wavelengths into an electromagnetic signal and to output the electromagnetic signal to the SCDM device, the SCDM device being adapted to receive the electromagnetic signal, to demultiplex the electromagnetic signal into at least two electromagnetic signals and to output the at least two electromagnetic signals.

2. The transceiver according to claim 1, wherein the transceiver is implemented in an Optical Backend Termination, OBT, the OBT being adapted to send and receive signals to and from at least two Optical Frontend Nodes, OFNs, comprised in the fibre network, the OBT further comprising at least two photo diodes and a Wavelength Division Demultiplexing device arranged between the RBF and the at least two photo diodes by having an input of the Wavelength Division Demultiplexing device connected to the blue channel of the RBF and having at least two outputs, each output connectable to a respective photo diode.

3. The transceiver according to claim 2, further comprising at least two SCM devices and at least two laser diodes, wherein the transceiver further comprises a Wideband Division Multiplexing, WDM, device arranged between the RBF and the at least two laser diodes, the WDM device having at least two inputs connected to a respective laser diode and an output connected to the red channel of the RBF, wherein the WDM device is arranged to multiplex received subcarriers and to output the multiplexed subcarriers to the RBF.

4. The transceiver according to claim 1, wherein the transceiver is implemented in an Optical Frontend Node, OFN, the OFN being comprised in the fibre network and connected to an Optical Backend Termination, OBT, also comprised in the fibre network, the transceiver further comprising a Band Pass Filter, BPF, arranged between the RBF and the photo diode by having an input connected to a blue channel of the RBF and an output connected to the photo diode.

5. An Optical Backend Termination, OBT, operable to be comprised in a fibre network, the OBT being adapted to send and receive signals to and from at least two Optical Frontend Nodes, OFNs, comprised in the fibre network, the OBT comprising a transceiver adapted for use in the fibre network, the transceiver comprising a Subcarrier Multiplexing, SCM, device; a laser diode; a Red-Blue Filter, RBF, having a red channel, a blue channel and a common channel; a photo diode, PD; and a Subcarrier Demultiplexing, SCDM, device, wherein the SCM device comprises at least two input ports and one output port, the SCM device being adapted to receive electromagnetic signals on the at least two input ports, to multiplex the electromagnetic signals into a multiplexed electromagnetic signal and to output the multiplexed electromagnetic signal to the laser diode, the laser diode being adapted to receive the multiplexed electromagnetic signal, to convert the multiplexed electromagnetic signal to optical signals comprising a plurality of subcarriers of different wavelengths distributed in frequency around a main optical carrier, and to output the plurality of subcarriers to the red channel of the RBF, the RBF being adapted to receive the plurality of subcarriers, and to output the plurality of subcarriers to the fibre network via the common channel, the RBF further being adapted to receive subcarriers on the common channel and to filter out blue frequencies of the received subcarriers and to output subcarriers having blue wavelengths to the photo diode, the photo diode being adapted to receive the subcarriers having blue wavelengths from the RBF, convert the received subcarriers having blue wavelengths into an electromagnetic signal and to output the electromagnetic signal to the SCDM device, the SCDM device being adapted to receive the electromagnetic signal, to demultiplex the electromagnetic signal into at least two electromagnetic signals and to output the at least two electromagnetic signals.

6. An Optical Frontend Node, OFN, operable to be comprised in a fibre network, the OFN being adapted to send and receive signals to and from an Optical Backend Termination, OBT, the OFN comprising a transceiver adapted for use in the fibre network, the transceiver comprising a Subcarrier Multiplexing, SCM, device; a laser diode; a Red-Blue Filter, RBF, having a red channel, a blue channel and a common channel; a photo diode, PD; and a Subcarrier Demultiplexing, SCDM, device, wherein the SCM device comprises at least two input ports and one output port, the SCM device being adapted to receive electromagnetic signals on the at least two input ports, to multiplex the electromagnetic signals into a multiplexed electromagnetic signal and to output the multiplexed electromagnetic signal to the laser diode, the laser diode being adapted to receive the multiplexed electromagnetic signal, to convert the multiplexed electromagnetic signal to optical signals comprising a plurality of subcarriers of different wavelengths distributed in frequency around a main optical carrier, and to output the plurality of subcarriers to the red channel of the RBF, the RBF being adapted to receive the plurality of subcarriers, and to output the plurality of subcarriers to the fibre network via the common channel, the RBF further being adapted to receive subcarriers on the common channel and to filter out blue frequencies of the received subcarriers and to output subcarriers having blue wavelengths to the photo diode, the photo diode being adapted to receive the subcarriers having blue wavelengths from the RBF, convert the received subcarriers having blue wavelengths into an electromagnetic signal and to output the electromagnetic signal to the SCDM device, the SCDM device being adapted to receive the electromagnetic signal, to demultiplex the electromagnetic signal into at least two electromagnetic signals and to output the at least two electromagnetic signals.

7. An Optical Distribution Network comprising a fibre network having an Optical Backend Termination, OBT, and at least two Optical Frontend Nodes, OFNs, and wherein the OBT and the at least two OFNs each comprise a transceiver adapted for use in the fibre network, each of the transceivers comprising a Subcarrier Multiplexing, SCM, device; a laser diode; a Red-Blue Filter, RBF, having a red channel, a blue channel and a common channel; a photo diode, PD; and a Subcarrier Demultiplexing, SCDM, device, wherein the SCM device comprises at least two input ports and one output port, the SCM device being adapted to receive electromagnetic signals on the at least two input ports, to multiplex the electromagnetic signals into a multiplexed electromagnetic signal and to output the multiplexed electromagnetic signal to the laser diode, the laser diode being adapted to receive the multiplexed electromagnetic signal, to convert the multiplexed electromagnetic signal to optical signals comprising a plurality of subcarriers of different wavelengths distributed in frequency around a main optical carrier, and to output the plurality of subcarriers to the red channel of the RBF, the RBF being adapted to receive the plurality of subcarriers, and to output the plurality of subcarriers to the fibre network via the common channel, the RBF further being adapted to receive subcarriers on the common channel and to filter out blue frequencies of the received subcarriers and to output subcarriers having blue wavelengths to the photo diode, the photo diode being adapted to receive the subcarriers having blue wavelengths from the RBF, convert the received subcarriers having blue wavelengths into an electromagnetic signal and to output the electromagnetic signal to the SCDM device, the SCDM device being adapted to receive the electromagnetic signal, to demultiplex the electromagnetic signal into at least two electromagnetic signals and to output the at least two electromagnetic signals.

8. A method performed by a transceiver for use in a fibre network, the transceiver comprising a Subcarrier Multiplexing, SCM, device; a laser diode; a Red-Blue Filter, RBF, having a red channel, a blue channel and a common channel; a photo diode, PD; and a Subcarrier Demultiplexing, SCDM, device, the method comprising:

receiving electromagnetic signals on at least two input ports of the SCM device, multiplexing the electromagnetic signals into a multiplexed electromagnetic signal and outputting the multiplexed electromagnetic signal to the laser diode;

receiving the multiplexed electromagnetic signal with the laser diode, converting the multiplexed electromagnetic signal to optical signals comprising a plurality of subcarriers of different wavelengths distributed in frequency around a main optical carrier, and outputting the plurality of subcarriers to the red channel of the RBF;

receiving the plurality of subcarriers with the red channel of the RBF, and outputting the plurality of subcarriers to the fibre network via the common channel, the RBF further receiving subcarriers on the common channel of the RBF and filtering out blue frequencies of the received subcarriers and outputting subcarriers having blue wavelengths to the photo diode;

receiving with the photo-diode the subcarriers having blue wavelengths from the RBF, converting the subcarriers having blue wavelengths into an electromagnetic signal and outputting the electromagnetic signal to the SCDM device; and receiving the electromagnetic signal with the SCDM device, demultiplexing the electromagnetic signal into at least two electromagnetic signals and outputting the at least two electromagnetic signals.

9. The method according to claim 8, wherein the transceiver is implemented in an Optical Backend Termination, OBT, and further comprises sending and receiving signals with the OBT to and from at least two Optical Frontend Nodes, OFNs, comprised in the fibre network, the photo diode of the OBT comprising at least two photo diodes and a Wavelength Division Demultiplexing device arranged between the RBF and the at least two photo diodes by having an input of the Wavelength Division Demultiplexing device connected to the blue channel of the RBF and having at least two outputs, each output connectable to a respective photo diode.

10. The method according to claim 9, wherein the transceiver comprises at least two SCM devices and at least two laser diodes, wherein the transceiver further comprises a Wideband Division Multiplexing, WDM, device arranged between the RFB and the at least two laser diodes, the WDM having at least two inputs connected to a respective laser diode and an output connected to the red channel of the RBF, wherein the method comprises multiplexing received subcarriers with the WDM device and outputting the multiplexed subcarriers to the RBF.

11. The method according to claim 8, wherein the transceiver is implemented in an Optical Frontend Node, OFN, the OFN being comprised in the fibre network and connected to an Optical Backend Termination, OBT, also comprised in the fibre network, the transceiver further comprising a Band Pass Filter, BPF, wherein the method comprises arranging the BPF between the RBF and the photo diode by having an input of the BPF connected to the red channel of the RBF and an output of the BPF connected to the photo diode.

12. A method performed by an Optical Backend Termination, OBT, operable to be comprised in a fibre network, for sending and receiving signals to and from at least two Optical Frontend Nodes, OFNs, comprised in the fibre network, the OBT further comprising a transceiver for use in the fibre network, the transceiver comprising a Subcarrier Multiplexing, SCM, device; a laser diode; a Red-Blue Filter, RBF, having a red channel, a blue channel and a common channel; a photo diode, PD; and a Subcarrier Demultiplexing, SCDM, device, the method comprising:

receiving electromagnetic signals on at least two input ports of the SCM device, multiplexing the electromagnetic signals into a multiplexed electromagnetic signal and outputting the multiplexed electromagnetic signal to the laser diode;

receiving the multiplexed electromagnetic signal with the laser diode, converting the multiplexed electromagnetic signal to optical signals comprising a plurality of subcarriers of different wavelengths distributed in frequency around a main optical carrier, and outputting the plurality of subcarriers to the red channel of the RBF;

receiving the plurality of subcarriers with the red channel of the RBF, and outputting the plurality of subcarriers to the fibre network via the common channel, the RBF further receiving subcarriers on the common channel of the RBF and filtering out blue frequencies of the received subcarriers and outputting subcarriers having blue wavelengths to the photo diode;

receiving with the photo diode the subcarriers having blue wavelengths from the RBF, converting the subcarriers having blue wavelengths into an electromagnetic signal and outputting the electromagnetic signal to the SCDM device; and receiving the electromagnetic signal with the SCDM device, demultiplexing the electromagnetic signal into at least two electromagnetic signals and outputting the at least two electromagnetic signals.

13. A method performed by an Optical Frontend Node, OFN, operable to be comprised in a fibre network, for sending and receiving signals to and from an Optical Backend Termination, OBT, the OFN further comprising a transceiver for use in the fibre network, the transceiver comprising a Subcarrier Multiplexing, SCM, device; a laser diode; a Red-Blue Filter, RBF, having a red channel, a blue channel and a common channel; a photo diode, PD; and a Subcarrier Demultiplexing, SCDM, device, the method comprising:

receiving electromagnetic signals on at least two input ports of the SCM device, multiplexing the electromagnetic signals into a multiplexed electromagnetic signal and outputting the multiplexed electromagnetic signal to the laser diode;

receiving the multiplexed electromagnetic signal with the laser diode, converting the multiplexed electromagnetic signal to optical signals comprising a plurality of subcarriers of different wavelengths distributed in frequency around a main optical carrier, and outputting the plurality of subcarriers to the red channel of the RBF;

receiving the plurality of subcarriers with the red channel of the RBF, and outputting the plurality of subcarriers to the fibre network via the common channel, the RBF further receiving subcarriers on the common channel of the RBF and filtering out blue frequencies of the received subcarriers and outputting subcarriers having blue wavelengths to the photo diode;

receiving with the photo-diode the subcarriers having blue wavelengths from the RBF, converting the subcarriers having blue wavelengths into an electromagnetic signal and outputting the electromagnetic signal to the SCDM device; and receiving the electromagnetic signal with the SCDM device, demultiplexing the electromagnetic signal into at least two electromagnetic signals and outputting the at least two electromagnetic signals.

14. A method performed by an Optical Distribution Network comprising a fibre network having an Optical Backend Termination, OBT, and at least two Optical Frontend Nodes, OFNs, wherein the OBT and the at least two OFNs each comprise a transceiver for use in the fibre network, each of the transceivers comprising a Subcarrier Multiplexing, SCM, device; a laser diode; a Red-Blue Filter, RBF, having a red channel, a blue channel and a common channel; a photo diode, PD; and a Subcarrier Demultiplexing, SCDM, device, the method comprising:

receiving electromagnetic signals on at least two input ports of the SCM device, multiplexing the electromagnetic signals into a multiplexed electromagnetic signal and outputting the multiplexed electromagnetic signal to the laser diode;

receiving the multiplexed electromagnetic signal with the laser diode, converting the multiplexed electromagnetic signal to optical signals comprising a plurality of subcarriers of different wavelengths distributed in frequency around a main optical carrier, and outputting the plurality of subcarriers to the red channel of the RBF;

receiving the plurality of subcarriers with the red channel of the RBF, and outputting the plurality of subcarriers to the fibre network via the common channel, the RBF further receiving subcarriers on the common channel of the RBF and filtering out blue frequencies of the received subcarriers and outputting subcarriers having blue wavelengths to the photo diode;

receiving with the photo diode the subcarriers having blue wavelengths from the RBF, converting the subcarriers having blue wavelengths into an electromagnetic signal and outputting the electromagnetic signal to the SCDM device; and receiving the electromagnetic signal with the SCDM device, demultiplexing the electromagnetic signal into at least two electromagnetic signals and outputting the at least two electromagnetic signals.

\* \* \* \* \*

UNITED STATES PATENT AND TRADEMARK OFFICE
CERTIFICATE OF CORRECTION

| | |
|---|---|
| PATENT NO. | : 9,124,368 B2 |
| APPLICATION NO. | : 14/004414 |
| DATED | : September 1, 2015 |
| INVENTOR(S) | : Urban et al. |

It is certified that error appears in the above-identified patent and that said Letters Patent is hereby corrected as shown below:

In the specification

Column 7, Lines 28-29, delete "laser diode 110" and insert -- laser diode 120 --, therefor.

Column 8, Line 44, delete "SDCM" and insert -- SCDM --, therefor.

Column 8, Line 56, delete "RFB," and insert -- RBF, --, therefor.

Column 9, Line 15, delete "WDM-MUX 130" and insert -- WDM-MUX 170 --, therefor.

Column 9, Line 41, delete "BFP 180." and insert -- BPF 180. --, therefor.

Column 10, Line 55, delete "network" and insert -- network. --, therefor.

Column 12, Line 30, delete "RFB," and insert -- RBF, --, therefor.

In the claims

Column 18, Line 53, Claim 10, delete "RFB" and insert -- RBF --, therefor.

Signed and Sealed this
Second Day of August, 2016

Michelle K. Lee
*Director of the United States Patent and Trademark Office*